United States Patent
Borras et al.

(10) Patent No.: US 8,713,241 B2
(45) Date of Patent: Apr. 29, 2014

(54) METHOD AND APPARATUS FOR AN ACTIVE LOW POWER MODE OF A PORTABLE COMPUTING DEVICE

(75) Inventors: Jaime A. Borras, Miramar, FL (US);
Jose M. Fernandez, Sunrise, FL (US);
Zaffer S. Merchant, Parkland, FL (US)

(73) Assignee: Wireless Silicon Group, LLC, Fort Lauderdale, FL (US)

( * ) Notice: Subject to any disclaimer, the term of this patent is extended or adjusted under 35 U.S.C. 154(b) by 1073 days.

(21) Appl. No.: 12/207,168

(22) Filed: Sep. 9, 2008

(65) Prior Publication Data
US 2010/0057983 A1    Mar. 4, 2010

Related U.S. Application Data

(60) Provisional application No. 61/092,329, filed on Aug. 27, 2008.

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 9/00* | (2006.01) | |
| *G06F 15/177* | (2006.01) | |
| *G06F 1/26* | (2006.01) | |
| *G06F 1/32* | (2006.01) | |

(52) U.S. Cl.
USPC .............. 711/103; 711/105; 711/154; 713/2; 713/320; 713/324

(58) Field of Classification Search
None
See application file for complete search history.

(56) References Cited

U.S. PATENT DOCUMENTS

| | | | |
|---|---|---|---|
| 5,386,552 A | * | 1/1995 | Garney ........................ 714/10 |
| 5,519,843 A | | 5/1996 | Moran et al. |
| 6,631,394 B1 | | 10/2003 | Ronkka et al. |
| 6,763,458 B1 | | 7/2004 | Watanabe et al. |
| 7,017,004 B1 | | 3/2006 | Calligaro et al. |

(Continued)

FOREIGN PATENT DOCUMENTS

| | | |
|---|---|---|
| GB | 2251324 A | 7/1992 |
| JP | 11298550 | 10/1999 |

(Continued)

OTHER PUBLICATIONS

Bez, R.; Camerlenghi, E.; Modelli, A.; Visconti, A., "Introduction to Flash Memory", Apr. 2003, IEEE, 91 Issue 4, pp. 489-502.*

(Continued)

*Primary Examiner* — Reginald Bragdon
*Assistant Examiner* — Stella Eun
(74) *Attorney, Agent, or Firm* — Patents on Demand P.A.; Scott M. Garrett; Brian K. Buchheit

(57) ABSTRACT

The present invention discloses a portable computing device (100) including a processor (102), alternate memory (106), and a DRAM memory (108). Under normal operating conditions, providing full functionality of the device, a full code instantiation in the DRAM is executed, providing operating system, user interface and application execution functionality. A reduced code instantiation (114) which duplicates certain elements of the operating system, user interface, and application code is maintained in the low power memory. When a condition occurs that dictates or allows, execution is switched from the full code instantiation to the reduced code instantiation, and the DRAM is shut off.

18 Claims, 4 Drawing Sheets

(56) References Cited

U.S. PATENT DOCUMENTS

| | | | |
|---|---|---|---|
| 7,076,675 B2 * | 7/2006 | Martinez Perez et al. | 713/324 |
| 7,134,118 B1 | 11/2006 | McNutt | |
| 7,234,052 B2 | 6/2007 | Lee et al. | |
| 7,461,275 B2 * | 12/2008 | Belmont et al. | 713/300 |
| 7,814,485 B2 * | 10/2010 | Morgan et al. | 718/100 |
| 7,904,897 B2 | 3/2011 | Rudelic | |
| 7,971,081 B2 | 6/2011 | Cooper et al. | |
| 2002/0064079 A1 * | 5/2002 | Sato et al. | 365/227 |
| 2005/0066207 A1 * | 3/2005 | Fleck et al. | 713/320 |
| 2005/0132123 A1 | 6/2005 | Glaum et al. | |
| 2005/0132179 A1 | 6/2005 | Glaum et al. | |
| 2006/0064576 A1 | 3/2006 | Chen | |
| 2006/0129861 A1 * | 6/2006 | Kee et al. | 713/323 |
| 2006/0133362 A1 | 6/2006 | Stein et al. | |
| 2007/0043938 A1 | 2/2007 | May et al. | |
| 2007/0233933 A1 | 10/2007 | Wang et al. | |
| 2007/0243937 A1 | 10/2007 | Hernandez | |
| 2007/0294550 A1 | 12/2007 | May et al. | |
| 2008/0077786 A1 | 3/2008 | Pierce et al. | |
| 2009/0100417 A1 * | 4/2009 | Bolanowski et al. | 717/168 |
| 2009/0132764 A1 * | 5/2009 | Moll et al. | 711/118 |

FOREIGN PATENT DOCUMENTS

| | | |
|---|---|---|
| JP | 2003167656 | 6/2003 |
| JP | 2004013299 | 1/2004 |
| JP | 2005107938 | 4/2005 |
| WO | 0067132 | 9/2000 |

OTHER PUBLICATIONS

Sun-Hoi Hur; Chul-Hi Han, "Nonvolatile SRAM cell using different capactiance loading", Feb. 5, 1998, IEEE, 34 Issue 3, pp. 251-253.*

Benavides, T., et al., "The Enabling of an Execute-In-Place Architecture to Reduce the Embedded System Memory Footprint and Boot Time." Journal of Computers, vol. 3, No. 1, pp. 79-89, Jan. 2008.

* cited by examiner

300

| CONDITION | MEMORY LOCATION | EXECUTION TIME |
|---|---|---|
| APPLICATION 1 | ADDRESS 1 | TIME 1 |
| ⋮ | ⋮ | ⋮ |
| LOW BATTERY | — | — |
| IDLE PROCESS | — | IDLE TIME |

302 — CONDITION
304 — MEMORY LOCATION
306 — EXECUTION TIME
308 — LOW BATTERY
310 — IDLE PROCESS

*FIG. 3*

METHOD AND APPARATUS FOR AN ACTIVE LOW POWER MODE OF A PORTABLE COMPUTING DEVICE

CROSS REFERENCE INFORMATION

This application is related to co-pending application titled "METHOD AND APPARATUS FOR FAST BOOTING A PORTABLE COMPUTING DEVICE ALLOWING FOR IMMEDIATE OPERATION" which is assigned to the assignee of the present application, filed evenly herewith, and having U.S. patent application Ser. No. 12/207,106, filed Sep. 9, 2008, the teachings of which are hereby incorporated by reference in their entirety; and claims priority to United States provisional application titled "METHODS AND SYSTEMS FOR ENHANCING A USER EXPERIENCE ON A MOBILE DEVICE USING NON-VOLATILE EXECUTE-IN-PLACE MEMORY" which is assigned to the assignee of the present application and filed evenly herewith, having U.S. Provisional Application No. 61/092,329, filed Aug. 27, 2008, the teachings of which are hereby incorporated by reference in their entirety.

BACKGROUND OF THE INVENTION

The present invention relates to the field of computing devices, and more particularly to power consumption reduction techniques in small, portable computing devices such as personal digital assistants and cell phones.

Portable electronic computing systems have evolved over the years from ROMized embedded systems with a small amount of RAM to the now conventional flash and RAM based systems that more resemble general purpose computing systems, having the ability to store and execute various application programs. The conventional three main factors considered in the design of these systems are cost, size, and power consumption. In recent years, the desire to load and execute application programs and other functions has driven the design towards a general operating system with ability to operate web browsers, portable code such as Java™, and other applications. A Java operating environment for such devices has been standardized, and is known as Java 2 Micro Edition (J2ME).

Presently, conventional small computing devices, including smart cellular phones, personal digital assistants (PDAs), and palm-top computers, use a non-volatile flash memory (NVM) to store a boot kernel and other operating system elements, application software, user interface (UI) elements, and data. For runtime scratchpad memory, it is typical to use a dynamic random access memory (DRAM). DRAM, since it uses only one transistor per bit/cell, can be significantly smaller than comparable static RAM, which uses 6 transistors per cell/bit. DRAM is also substantially less expensive. However, a DRAM needs constant refreshing to maintain the data stored therein. The constant refreshing consumes power. Since at least any portion of the DRAM with code or data must be refreshed, as small computing devices become more sophisticated and are able to execute larger applications and user interface elements, the power consumption of DRAM will increase as well by virtue of the memory size of the DRAM increasing.

As mentioned, a static RAM may be used, but at substantially higher cost and volume. The DRAM must be refreshed even when only a small amount of the code instantiated in the memory is being executed, which can be very inefficient.

Therefore there is a need for a means by which a DRAM can be used, but the power consumption of the DRAM may be reduced

BRIEF SUMMARY OF THE INVENTION

The invention provides, in one embodiment, a method of reducing power consumption in a portable computing device. The method commences while executing code from a full code instantiation in a dynamic random access memory (DRAM), which includes maintaining state and context information in the DRAM while executing code from the full code instantiation. A reduced code instantiation is maintained in a low power memory which may be addressable over the same bus as the DRAM. The reduced code instantiation is a copy of a subset of the code in full code instantiation. The method commences upon detecting a low power opportunity condition, and switching execution from the DRAM to the reduced code instantiation, including copying the state and context information from the DRAM into an alternate memory, performed in response to detecting the low power opportunity condition. Once execution is switched to the reduced code instantiation the device powers off the DRAM.

The invention provides in another embodiment a method of re-directing code execution in a portable computing device to facilitate an active low power operating mode. The portable computing device includes a DRAM which contains a full code instantiation. A low power memory contains a reduced instantiation reduced code instantiation which duplicates at least essential user interface and application code elements of the full code instantiation. The method commences by executing from the full code instantiation in the DRAM while maintaining state and context information related to execution of the full code instantiation in the DRAM. Upon detecting occurrence of a low power opportunity condition, the device commences switching execution from the DRAM to the reduced instantiation, which includes copying the state and context information from the DRAM into an alternate memory. Upon switching execution to the reduced code instantiation in the low power memory, the DRAM is powered off.

The invention provides in a further embodiment a portable computing device which includes a processor coupled to a common bus, a DRAM coupled to the common bus and which has a full code instantiation stored therein, and an alternate memory coupled to the common bus having a reduced code instantiation stored therein. The reduced code instantiation duplicates essential code elements of the full code instantiation. The full operating code is executed by the processor, and configures the processor to maintain state and context information related to execution of the full code instantiation in the DRAM, as well as to detect an occurrence of a low power opportunity condition. Upon detecting an appropriate condition, the processor is configured to switch execution from the DRAM to the reduced instantiation reduced code instantiation, and copy the state and context information from the DRAM into an alternate memory. Upon switching execution to the reduced code instantiation in the low power memory, the processor powers off the DRAM.

BRIEF DESCRIPTION OF THE SEVERAL VIEWS OF THE DRAWINGS

FIG. 3 is a tracking table for use in determining when to switch execution from the DRAM to the low power memory, in accordance with an embodiment of the invention.

DETAILED DESCRIPTION OF THE INVENTION

Figure 1:
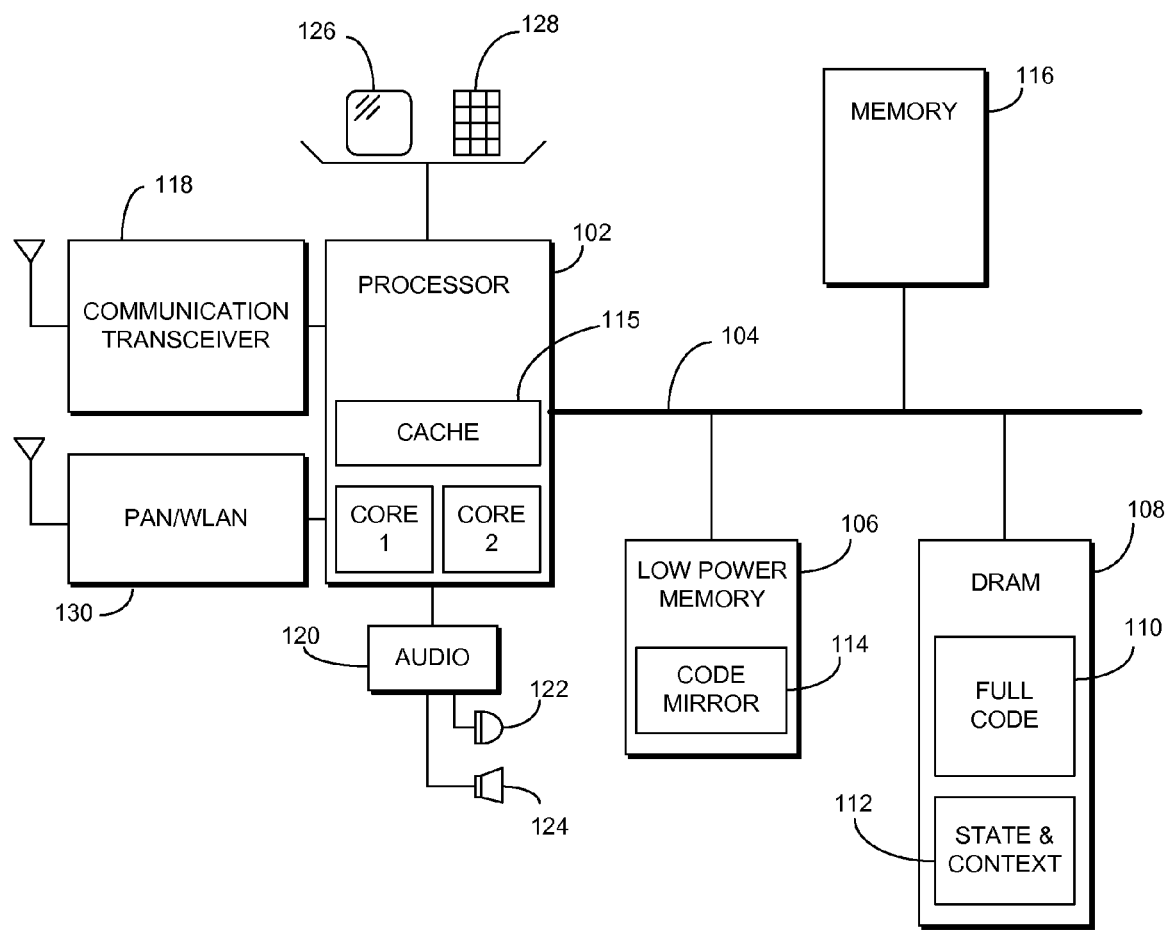
FIG. 1 is a computer architecture for a portable computer device, in accordance with an embodiment of the invention.

The present invention discloses a solution for the problem of power consumption associated with the use of a DRAM for scratchpad and execution memory in a portable computing device. More specifically, the invention duplicates essential code being executed in DRAM in a low power memory. The amount of essential code is smaller than in the full code instantiation in the DRAM. Under certain pre-defined circumstances, the device switches from executing code in the DRAM to executing code in the low power memory, allowing the device to power off the DRAM. The reduced code instantiation contains operating system, user interface, and application elements such that the user interface will remain substantially unchanged while executing the reduced code, and applications in progress will continue to function substantially the same as well. The DRAM remains off until there is an indication that additional code not available in the low power memory is needed, at which time the device powers up the DRAM, re-loads the full code instantiation, and switches execution back to the DRAM.

The low-power application kernel version of the main application/GUI code can be designed and built specifically to execute-in-place out of flash NVM and provide a reduced but consistent version of the Idle/Home screen look-and-feel as the main version but with only the priority or critical applications enabled for device operation such as Voice Telephony, Push-to-Talk (PTT), Messaging and Browser. The set of applications and functionality selected to build the XIP kernel in flash NVM can be determined by minimal use of Scratchpad memory cache size requirements available in the processor.

When a low battery condition is detected the system, either dynamically or through user prompt, saves the current system state and context information from the DRAM to an alternate memory, such as, for example, flash NVM, turns off power to the DRAM memory supply pins and may perform a mode switch to execute the low-power XIP kernel from flash NVM utilizing an internal cache of the processor for scratchpad.

An alternate embodiment of the invention includes a method of operating a handheld mobile electronic device having a processor, execute-in-place non-volatile memory (XIP NVM), and dynamic random access memory (DRAM), includes detecting a low power mode for the handheld mobile electronic device, storing an application kernel in the XIP NVM, executing-in-place the application kernel from the XIP NVM upon detecting the low power mode, and duty cycling the DRAM to reduce current drain until the handheld mobile electronic device exits the low power mode. Detecting a low battery mode comprises detecting a low battery charge condition, or a different profile. The method can further store state and a context data in either the XIP NVM or in an internal scratchpad memory internal to the processor that is shared between the XIP NVM and the DRAM. The method can further learn or self-profile or use a user selected profile to determine when the DRAM can be turned off and instead execute-in-place an application kernel from the XIP NVM. The method can also dynamically switch to the XIP NVM from the DRAM when the handheld electronic device is in a hibernate mode or an application has idled for more than a predetermined amount of time.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" "device" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory), a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, there is shown a block schematic diagram of a computer architecture 100 for a portable computer device, in accordance with an embodiment of the invention. A processor 102 is coupled to a common bus 104. A low power memory 106 and a dynamic random access memory (DRAM) 108 are further coupled to the common bus 104. The low power memory is used to operate the device in a low power mode, and may be, for example, a byte addressable flash memory, such as a NOR type flash memory. In one embodiment the low power memory 106 further provides bulk storage and is used to store boot code, operating system code, user interface code, application code, shared code, data, and other code elements which may be instantiated in the DRAM upon powering up the device.

Upon powering up the device, a full code instantiation 110 is established in the DRAM. The full code instantiation includes the necessary user interface and application elements that are intended to be present upon powering up the device for use by a user, as is accomplished by a conventional boot up process. Operating system elements may also be present in the full code instantiation, or may be executed from a non-volatile boot memory which may be the low power memory 106. State and context information 112 is established and maintained in the DRAM as well. The state and context information is produced while executing code and includes state variable, data variables, stacks, pointers, and so on, as is known. A code mirror comprising a reduced code instantiation 114 is maintained in the low power memory. If the low power memory is non-volatile memory, the reduced code instantiation will persist through power cycles, otherwise the reduced code instantiation may be generated while executing the full code instantiation in a background process and stored in the low power memory. The reduced code instantiation contains duplicate code of code in the full code instantiation, and may include duplicate operating system, as well as user interface and application code. However, the reduced code instantiation does not contain a complete duplication of the full code instantiation. Instead, it contains a smaller code set, and includes, for example, essential operating system, user interface, and application code to operate in a low power mode when the DRAM is powered off.

In one embodiment, the reduced code instantiation is used as an initial boot kernel, which is "executed in place" in the low power NOR type flash memory. Using the reduced code instantiation upon start up allows immediate, although limited use of the device upon powering up the device. As the reduced code instantiation is executed, the full operating code is instantiated in the DRAM, and upon completion of the full code instantiation, execution switches to the DRAM. In one embodiment both the DRAM and low power memory may conform to the Joint Electron Devices Engineering Council (JEDEC) specification referred to as LP DDR2, which allows a clock speed of up to 533 MHz and an operating voltage of 1.2 volts. Accordingly, the processor 102 and common bus 104 are configured to operate at the same clock speed and operating voltage as the DRAM memory.

In an alternate embodiment, the low power memory 106 may be used exclusively for bulk storage, and a second memory 116 may be used to instantiate the reduced code instantiation. The second memory 116 may be a NOR type flash, or a static RAM. Since the size of the reduced code instantiation is smaller than the full code instantiation, using a SRAM with a smaller memory size than the DRAM may be desirable in some designs. It is further contemplated that the code mirror in the low power memory is an execute in place kernel that persists through power cycles by virtue of the low power memory being a non-volatile memory such as a NOR type flash memory.

Once booted and operating normally, while executing code from the full code instantiation 110, the device may experience a low power opportunity condition. For example, the device may be in an idle condition, without user input, for a period of time. Another low power opportunity condition may be a low battery condition. The device may switch execution to the reduced code instantiation when the battery charge level drops to a predefined level, and execution from the reduced code instantiation maybe used to extend operating time of the device at the expense of full operation. Another example of a low power opportunity condition is when the device commences a mode of an application which indicates the user will not change modes for some time, such as occurs if the device is a cellular phone, and the user commences a phone call mode.

While commencing the phone call a calling application is executed. Typically the user does not initiate other applications. The code being executed may be substantially mirrored in the reduced code instantiation 114. Once the condition is detected, the device may copy the relevant state and context information to an alternate memory, such as, for example, processor cache 115. The state and context information that is copied is the information corresponding to the code in the reduced code instantiation. Other state and context information may be ignored. Using the relevant state and context information provides continuity of execution from the full code to the reduced code.

To facilitate switching execution from the DRAM to the low power memory, the operating system may maintain pointer stacks for each memory. Upon switching, the executed code uses the pointer stack associated with the memory being executed. The state and context information may be vectored to the reduced code instantiation as well. Preferably the user interface appears the same as when the full code instantiation is executed, although higher level features which may not be available may be disabled and indicated as being disabled by being shown grayed out in the user interface when executing from the reduced code instantiation. Once execution from the reduced code instantiation commences, the DRAM may be shut down to reduce power consumption.

While executing from the reduced code instantiation, the user may wish to use additional functions, user interface elements, or applications not supported by the reduced code instantiation. When that happens, the DRAM is powered on, and the operating system executed by the reduced code instantiation begins re-instantiating the full operating code in the DRAM while execution continues from the reduced code instantiation. Upon completing the full code instantiation, including code for the requested user interface elements or applications, execution is switched back to the DRAM, and execution of the full operating code commences.

It is further contemplated that the reduced code instantiation may be used for an "emergency" type operation, where continuity of execution is not critical, but, for example, conserving power is critical. For example, in the case of the device being a "smart" phone, with the ability to operate a sophisticated operating system and execute various application programs, to conserve power the user may wish to have the device configured to operate as a simple cellular phone, shutting off all unnecessary sub-systems. In such an example, the reduced code instantiation would provide code to operate the device as a cellular phone only, allowing the DRAM and other components to be powered off. The state and context information in such an example is not critical, and it would not be necessary to preserve such information in such a case.

The device 100 may be any one of a variety of portable computing devices, including personal digital assistants, cellular phones including so called "smart" phones, palm top computers, and on. The exemplary embodiment illustrated in FIG. 1 is that of a communication device, such as cellular phone. Accordingly, the device includes a communication transceiver 118, and an audio processor 120. The communications transceiver includes the necessary baseband processor, modulator and demodulator, amplifier, filters, and antenna to communicate over cellular communication networks. Acoustic signals from, for example, the voice of a user of the device are received at a microphone 122 and converted to a digital audio signal, which may be passed to the communication transceiver for transmission. Similarly, modulated audio signals received by the communication transceiver may be demodulated, and passed to the audio processor, which converts them to analog form to be played over a speaker 124, such as an earpiece speaker.

To facilitate operation of the device, input/output elements such as a graphical display 126 and a keypad 128 and other buttons may be provided. The graphical display present information to the user in visual form, and the keypad allows the user to information into the device, as well as select options presented on the graphical display, as is known.

In the present embodiment, it is expected that user of the device may desire to make a phone call upon powering up the device. Accordingly, one application that will be included in the reduced code instantiation is a calling application which allows the user make and receive phone calls. Since the application is included in the reduced code instantiation of the code mirror, the user will be able to use the device for calling while the device is operating in the low power mode with the DRAM shut off, or otherwise operated in reduced power consumption mode, which may include duty cycling the DRAM. The calling application may include access to a phone book or contact list, speed calling, as well as the basic support for carrying out calling activity.

It is further contemplated that the device may include a local or personal area network transceiver 130. The transceiver 130 may be used for a variety of applications, including connecting to data networks, wireless accessories, and so on. Voice calling over data networks may be supported using the transceivers 130 and 118.

Figure 2:
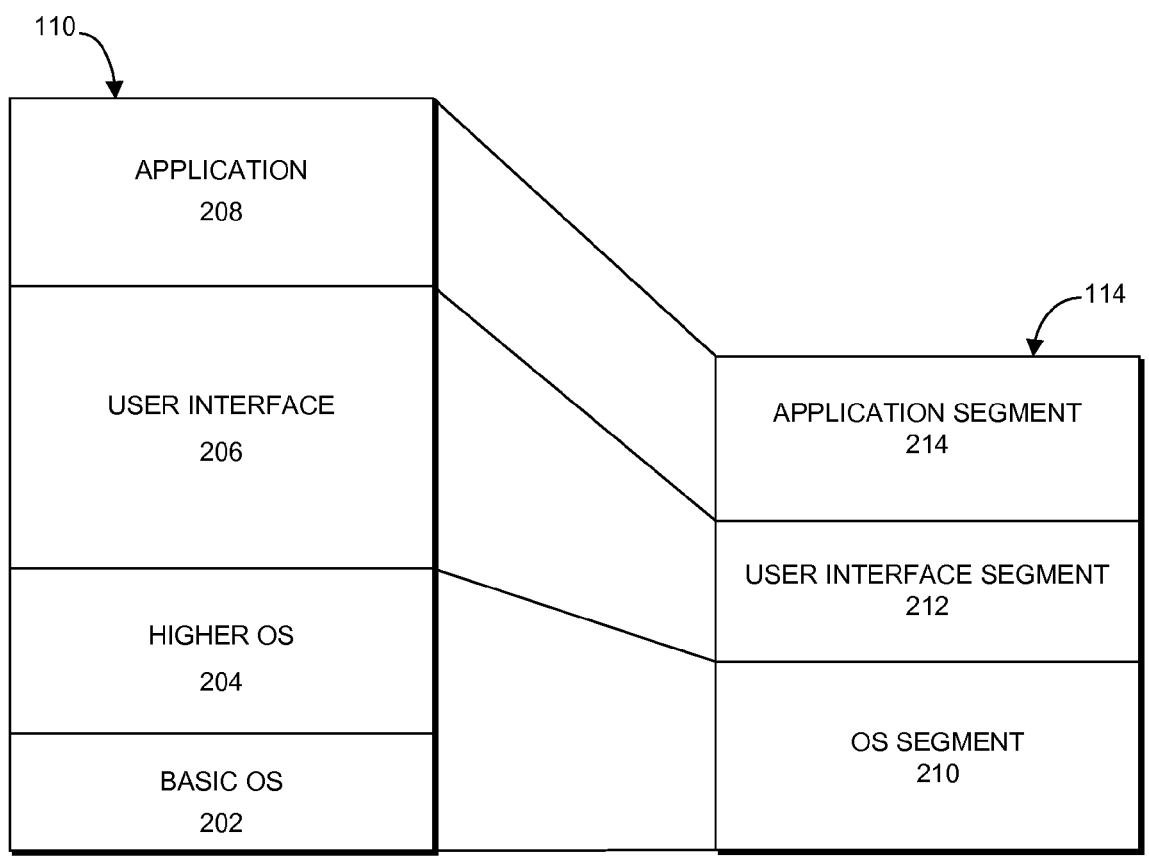
FIG. 2 is a memory diagram of the DRAM and a low power memory for switching execution from the DRAM to the low power memory, in accordance with an embodiment of the invention.

Referring now to FIG. 2, there is shown a memory diagram of a full code instantiation 110, and a reduced code instantiation code mirror 114, in accordance with an embodiment of the invention. The full code instantiation 110 may include an operating system segment comprised of a basic operating system segment 202 and higher operating system segment 204. It is contemplated, however, that operating system code may be executed from another location, such as a boot up execute in place kernel in a non-volatile memory. The full code instantiation includes a user interface segment 206 and an application segment 208. The basic OS segment includes code for establishing, for example, a timing system, basic input and output operation, pointer stack maintenance, and so on. Higher OS code provides, for example, higher level operating system support, communication with other components of the device, as well as the code for maintaining state and context information, and code or switching execution to the low power memory at the appropriate time. The user interface segment includes all user interface elements necessary for presenting the user with a functioning interface, including graphical elements for a graphical user interface, and menuing functions. The application code segment includes any applications configured to run upon booting up the device, as well as any applications the user has requested to have loaded and run after booting up the device.

The reduced code instantiation 114 in one embodiment duplicates some of the code in the full code instantiation, allowing essential operations and features to be performed.

The essential operations duplicated in the reduced code instantiation are a matter of engineering choice. The reduced code instantiation includes an operating system segment 210, a user interface segment 212, and an application segment 214. The user interface segment preferably includes user interface elements to substantially duplicate the user interface presented by the full code instantiation, with the exception that some functions may not be available. Those options which are not available in the user interface may be shown, but disabled and their corresponding graphical elements grayed out in the user interface. The application segment 214 includes code for application programs which are commonly used, or necessary for basic operation. So, whereas the full code instantiation may have, for example, 10 applications loaded, the application segment of the reduced code instantiation may have only 2-3 applications. The application code in the application segment may be optimized versions of applications to reduce the memory footprint by removing some functions of the application. As with non-functional user interface elements, non-functional features of applications may be shown, but not active, and grayed out. It is contemplated that the user may select applications to be included in the application segment. The user may have certain favorite applications, such as, for example, an email application. Thus at least one of the applications in the reduced code instantiation may have been selected by the user.

FIG. 3 shows a profile or tracking table 300 for use in determining when to switch execution from the DRAM to the low power memory, in accordance with an embodiment of the invention. The table is an abstraction of events which may be used to trigger the change of execution from the DRAM to execution of the reduced code instantiation in the low power memory. For example, a condition 302 may be identified, such as a particular application being executed. A memory location 304 may be identified indicating a particular mode of an application is active. Furthermore, there may be a preselected time period 306 that must pass indicating the user will likely remain in the mode for some time.

Other low power opportunity conditions may be defined which are not related to operation or execution of an application, such as a low battery indication 308. The user may select, as an option, to use the reduced code instantiation of the reduced code instantiation upon the battery level dropping to a pre-selected level in order to conserve battery life. Additionally, the occurrence of a standby or idle mode 310 may be used to trigger the shutdown of the DRAM and commence execution from the reduced code instantiation. The profile 300 may be set by the manufacturer of the device, or it may be user-configurable, or it may be learned by tracking usage of the device to identify application usage patterns which lend themselves to low power operation.

Figure 4:
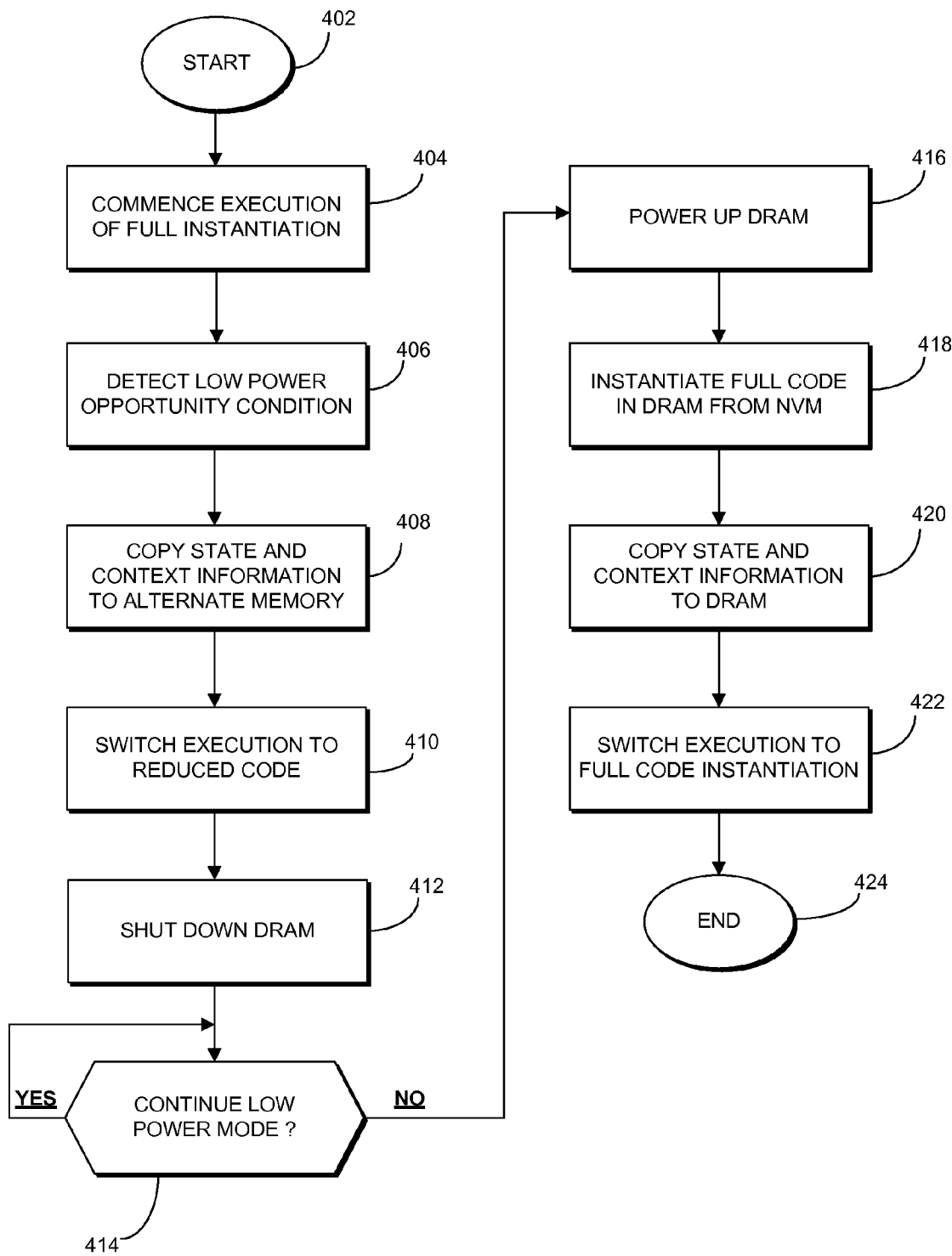
FIG. 4 is a flow chart diagram of a method of switching execution from a DRAM to a low power memory to reduce operating power consumption, in accordance with an embodiment of the invention.

FIG. 4 is a flow chart diagram of a method 400 of switching execution from a DRAM to a low power memory to reduce operating power consumption, in accordance with an embodiment of the invention. At the start 402, the device is powered on, and booted up. Execution of the full code instantiation in the DRAM is then commenced (404). While operating from the DRAM, a low power opportunity condition is detected (406). The low power opportunity condition may be the occurrence of the execution of a particular application, which has been pre-defined, or a mode of an application, such as commencing a phone call using a calling application. It may also be an indication from the user of the device to enter the low power mode. Other conditions may be used to trigger the low power mode, including the occurrence of a low battery condition, or an idle condition. Once the decision to commence the low power mode is made, the device may copy the relevant state and context information to an alternate memory (408). The alternate memory may be, for example, a processor cache. The device then switches execution from the DRAM to the alternate memory. Preferably the reduced code instantiation is instantiated in the alternate memory prior to commencing the method 400. If the reduced code instantiation is an execute in place kernel used to boot the device, the reduced code instantiation will be ready for immediate execution. Any state and context information copied to the alternate memory may then be used by the reduced code instantiation for continuity of execution. Once execution from the reduced code instantiation commences, the DRAM can be shut down (412), and the device is then operating an active low power mode. The active low power mode allows use of the device, but conserves power by virtue of having the DRAM shut off.

While in the active low power mode, the operating system, as instantiated in the low power memory, continues to check if the active low power mode is no longer appropriate (414). As long as conditions remain amenable to the active low power mode operation the device will remain in the active low power mode. When the device needs to perform tasks or applications not supported by the reduced code instantiation, or when the conditions otherwise change allowing full operating code execution, such as if the battery becomes charged back up to a sufficient charge level, the DRAM may be powered up (416) in preparation to re-insatiate the full operating code (418). Re-instantiating the full operating code is similar to a boot up process where a binary kernel may be decompressed from a non-volatile memory, which may be the low power memory storing the reduced code instantiation, and loaded into the DRAM, along with user interface code and appropriate application code. However, unlike a conventional boot process, where the device is not functional during the boot up process, the device continues executing from the reduced code instantiation, allowing use and functionality of the device, albeit limited functionality. The state and context information is copied into the DRAM as well (420) to facilitate continuity of execution. Once the full operating code is instantiated in the DRAM, the device switches execution to the DRAM, allowing full functionality of the device, including the ability to load and run additional applications not supported by the reduced code instantiation. The method then terminates (424) for the purpose of the example, however those skilled in the art will recognize that the method may be repeated for a variety of conditions and circumstances.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of reducing power consumption in a portable computing device, comprising:
   upon powering up the portable computing device, executing an execute-in-place boot kernel in a low power memory of the portable computing device which causes a processor of the portable computing device to load a full code instantiation in a dynamic random access memory (DRAM) of the portable computing device, wherein the full code instantiation provides a user interface and at least one application, and wherein the low power memory is a byte-addressable non-volatile memory;
   subsequent to executing the boot kernel, executing code by the processor of the portable computing device from the full code instantiation in the DRAM;
   the processor maintaining state and context information produced while executing code of the full code instantiation in the DRAM;
   maintaining a reduced code instantiation in the low power memory while executing the full code instantiation, the reduced code instantiation containing a subset of the code in the full code instantiation;
   the processor detecting a low power opportunity condition;
   the processor switching execution from the DRAM to the reduced code instantiation by the processor, including copying state and context information from the DRAM into an alternate memory and using the state and context information to execute the reduced code instantiation to maintain continuity of execution of the user interface and the at least one application, performed in response to detecting the low power opportunity condition; and
   upon switching, the processor powering off the DRAM and continuing to operate the portable computing device by executing the reduced code instantiation.

2. A method of reducing power consumption as defined in claim 1, wherein the non-volatile memory and DRAM are addressable over a common bus.

3. A method of reducing power consumption as defined in claim 1, wherein the non-volatile memory is a NOR type flash memory.

4. A method of reducing power consumption as defined in claim 1 wherein copying the state and context information from the DRAM into an alternate memory comprises copying the state and context information into a processor cache.

5. A method of reducing power consumption as defined in claim 1, further comprising:
   detecting a need to resume running the full code instantiation;
   powering up the DRAM;
   while executing from the reduced code instantiation, re-loading the full code instantiation into the DRAM and copying the state and context information into the DRAM; and
   upon completion of re-loading the full code instantiation, executing from the full code instantiation in the DRAM, wherein the state and context information is used to continue execution in the DRAM.

6. A method of re-directing code execution in a portable computing device to facilitate an active low power operating mode, the portable computing device containing a DRAM containing a full code instantiation that provides a user interface and at least one application, a low power memory containing a reduced code instantiation which duplicates at least essential user interface and application code elements of the full code instantiation, the method comprising:
   booting the portable computing device from an execute-in-place boot kernel in a non-volatile memory, including loading the reduced code instantiation in the low power memory and loading the full code instantiation in the DRAM;
   executing from the full code instantiation in the DRAM by a processor of the portable computing device, including providing the user interface and executing the at least one application;
   detecting occurrence of a low power opportunity condition;
   switching execution by the processor from full code instantiation in the DRAM to the reduced code instantiation in response to detecting the low power opportunity condition, wherein switching execution maintains continuity of execution of the user interface and at least one application; and
   upon switching execution to the reduced code instantiation in the low power memory, powering off the DRAM while continuing to execute the reduced code instantiation.

7. A method of re-directing code execution as defined in claim 6, further comprising:
   maintaining state and context information related to execution of the full code instantiation in the DRAM while executing code of the full code instantiation; and
   wherein switching execution to the reduced code instantiation includes copying state and context information from the DRAM into an alternate memory, the state and context information in the alternate memory is used to maintain continuity of execution upon commencing execution of the reduced code instantiation.

8. A method of re-directing code execution as defined in claim 7, wherein copying the state and context information from the DRAM into an alternate memory comprises copying the state and context information into a processor cache.

9. A method of re-directing code execution as defined in claim 6, wherein detecting occurrence of a low power opportunity condition is performed by commencing execution a pre-selected mode of an application which is mirrored in the reduced code instantiation, and wherein execution of the pre-selected mode has commenced for a pre-selected time.

10. A method of re-directing code execution as defined in claim 9, wherein the portable computing device is a cellular phone, the pre-selected mode is a mode of a calling application when a call is in progress.

11. A method of re-directing code execution as defined in claim 6, wherein maintaining the reduced code instantiation comprises maintaining the reduced code instantiation in a non-volatile memory.

12. A method of re-directing code execution as defined in claim 11, wherein the non-volatile memory and DRAM are addressable over a common bus.

13. A method of re-directing code execution as defined in claim 12, wherein the non-volatile memory is a NOR type flash memory.

14. A method of re-directing code execution as defined in claim 6 wherein maintaining the reduced code instantiation comprises maintaining the reduced code instantiation in a static random access memory.

15. A portable computing device, comprising:
a processor coupled to a common bus that executes an execute-in-place boot kernel upon the portable computing device being powered up;
a DRAM coupled to the common bus having a full code instantiation stored therein by the processor in response to the processor executing the boot kernel, wherein the full code instantiation provides a user interface and at least one application;
a low power memory coupled to the common bus having a reduced code instantiation stored therein, the reduced code instantiation duplicating essential code elements of the full code instantiation;
wherein the full code instantiation is executed by the processor subsequent to execution of the boot kernel, and causes the processor to:
 maintain state and context information related to execution of the full code instantiation in the DRAM;
 detect an occurrence of a low power opportunity condition;
 switch execution from the DRAM to the reduced code instantiation, and copy state and context information relevant to the reduced code instantiation from the DRAM into an alternate memory, the state and context information being used to maintain continuity of execution of the user interface and at least one application upon executing the reduced code instantiation, performed in response to detecting the low power opportunity condition; and
 upon switching execution to the reduced code instantiation in the low power memory, power off the DRAM.

16. A portable computing device as defined in claim 15, wherein the low power opportunity condition is detected by execution of a pre-selected mode of an application which is in the reduced code instantiation, and wherein execution of the pre-selected mode has commenced for a pre-selected period of time.

17. A portable computing device as defined in claim 15, the low power memory is a NOR type flash memory.

18. A portable computing device as defined in claim 15, wherein the processor being caused to copy the state and context information to an alternate memory comprises the processor being caused to copy the state and context information into a processor cache of the processor.

* * * * *